United States Patent [19]

Wilcken

[11] Patent Number: 5,220,455
[45] Date of Patent: Jun. 15, 1993

[54] PASSIVE, GRAVITY REFERENCING, FLUID DAMPED, TWO STAGE PENDULUM OPTICAL MOUNT

[76] Inventor: Stephen K. Wilcken, 255 Humberd La., Grants Pass, Oreg. 97527

[21] Appl. No.: 796,509

[22] Filed: Nov. 21, 1991

[51] Int. Cl.⁵ ............................................. G02B 27/64
[52] U.S. Cl. .................................. 359/554; 359/638; 359/834; 359/896; 356/149; 356/250
[58] Field of Search .................... 359/554–557, 359/831–837, 819, 820, 638, 896; 356/149, 250, 153

[56] References Cited

U.S. PATENT DOCUMENTS

| | | | |
|---|---|---|---|
| 3,612,694 | 10/1971 | Mottier et al. | 356/351 |
| 3,838,927 | 10/1974 | Iwafune et al. | 356/250 |
| 4,123,136 | 10/1978 | Dahab et al. | 359/555 |
| 4,333,242 | 6/1982 | Genho | 356/138 |
| 4,854,704 | 8/1989 | Funazaki et al. | 356/149 |
| 4,889,425 | 12/1989 | Edwards et al. | 356/153 |

FOREIGN PATENT DOCUMENTS

| | | | |
|---|---|---|---|
| 1183269 | 12/1964 | Fed. Rep. of Germany | 359/556 |
| 1237337 | 3/1967 | Fed. Rep. of Germany | 356/250 |
| 1386114 | 12/1964 | France | 359/556 |
| 582228 | 9/1958 | Italy | 356/250 |
| 617147 | 2/1961 | Italy | 359/554 |
| 365228 | 12/1962 | Switzerland | 359/556 |

*Primary Examiner*—Jon W. Henry
*Attorney, Agent, or Firm*—Conrad O. Gardner; B. A. Donahue

[57] ABSTRACT

A mount for use by optical elements in a laser tooling alignment system. The mount provides a high degree of isolation from external rotational disturbances about any horizontal axis (i.e., pitch and roll) by retaining optical components in a fixed relationship to the local gravity gradient. The mount is a passive gravity referencing two stage, fluid damped pendulum. When a constant deviation optic (e.g. pentaprism beam splitter) is attached to the mount, effective isolation from yaw disturbances is also achieved.

2 Claims, 2 Drawing Sheets

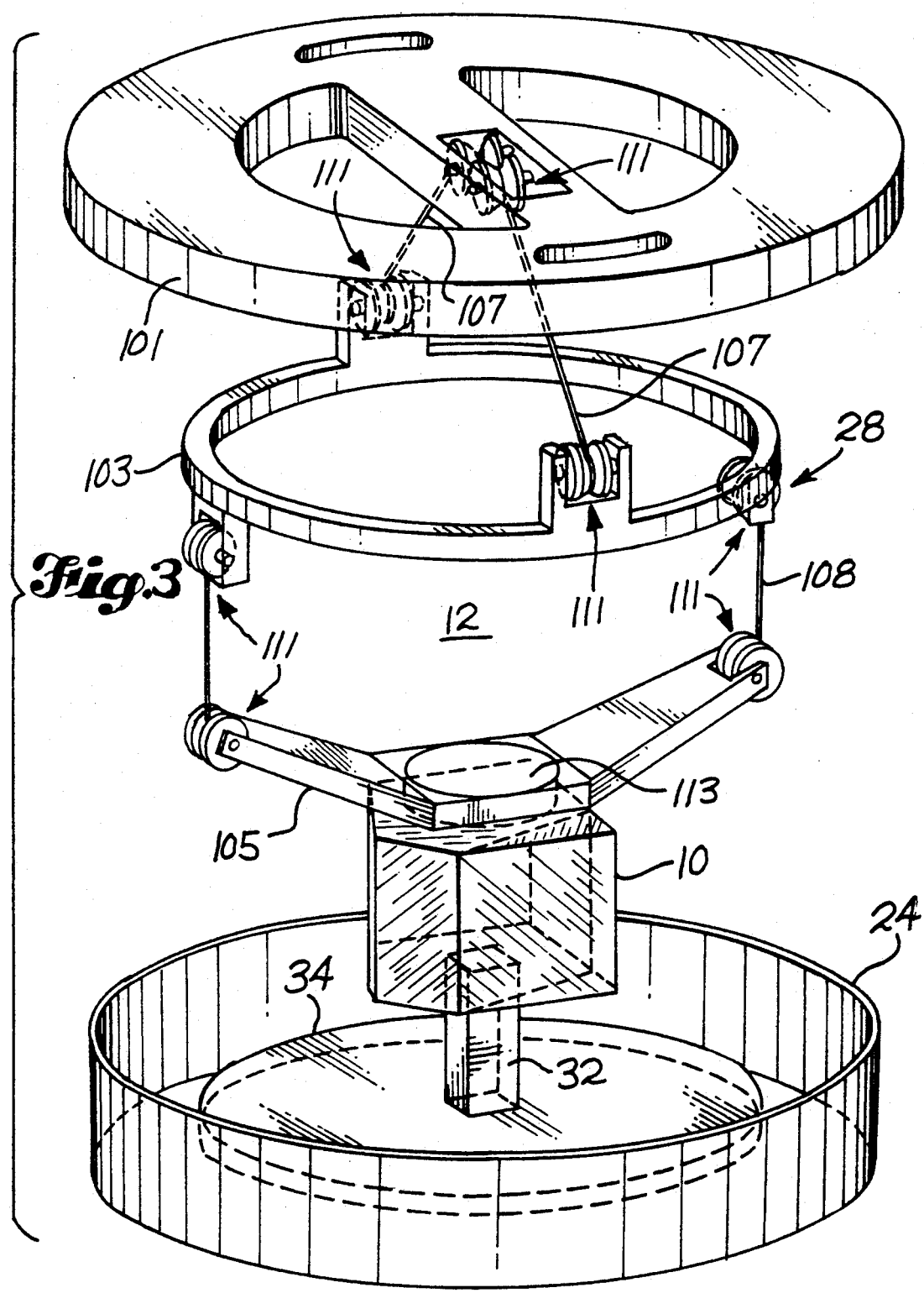

PASSIVE, GRAVITY REFERENCING, FLUID DAMPED, TWO STAGE PENDULUM OPTICAL MOUNT

BACKGROUND OF THE INVENTION

The present invention relates to an optical mount. The alignment status of large tools and jigs used in airplane assembly factories are measured and reset at periodic intervals. Standard optical tooling, consisting of jig transits, optical levels, alignment telescopes, lasers, etc., are typically used in the re-alignment process. With standard optical tooling, it is possible to align jigs and tools to a fairly high degree of accuracy, typically to within a few thousandths of an inch over distances of 20 or 30 feet (limited by the angular resolution capability of the optical tooling, and the finesse of the human operator). However, alignment checks are usually only possible when a tool is empty, because one or more tooling fiducials are typically obscured when a part is loaded on the tool. This leads to the possibility of part rework due to undetected misalignment conditions which may occur during part build-up.

LAST (Laser Alignment System for Tooling, U.S. Pat. No. 4,889,425; issued Dec. 26, 1989 and assigned to The Boeing Company) was developed to provide for continuous monitoring of tool alignment to 0.001" over distances of 150 to 200 feet. The phototype LAST was comprised of a low-power CW laser, optical area-array detectors and associated electronics, and a 3-dimensional laser gage beam network created by means of parallel-plate optical beam splitters rigidly attached to the testbed jig at strategic sites along the beam path.

The prototype LAST was shown to be capable of detecting displacements in the testbed jig as small as 0.0004" over distances of 150 feet, which implies an instantaneous angular resolution capability of 1/20th of an arc second. However, this resolution capability was not actually realized on the testbed jig because of time-varying local disturbances in the boresight direction of the laser and in the angular orientation of the beam splitters. Thus, although very minute disturbances in the alignment of the testbed jig were detectable by LAST, the exact nature of the disturbances was difficult or impossible to discern.

In order to realize the full benefit of LAST and other such systems which utilize laser beams as gages, it is essential that the beamsplitters located at critical branching points in the beam path, along with the laser itself, be isolated from externally induced attitude disturbances. It is clear that the level of isolation must be extremely high in order to prevent unwanted angular disturbances of the gage beam from masking actual jig motions of the order of 0.0004" over distances of 150 feet (i.e., on the order of 1/20th arc second). If the laser gage beam is successfully isolated from the jig structure, the deflection data provided by the optical detectors may then be used to prescribe a series of corrective actions to bring the tool or jig to an undistorted state, thereby driving the observed deflections to zero.

One approach for monitoring (but not maintaining) the dimensional integrity of the laser gage beam involves the use of electronic tilt sensors, which can be used to monitor changes in the attitude of the beamsplitters and in the laser itself. Tilt sensors are available which are capable of providing reliable tilt data for angular changes of less than 1 arc second. This approach requires the use of a single tilt sensor for monitoring the pitch attitude of the laser, and a pair of tilt sensors (for pitch and roll) attached to each beamsplitter located at each major node in the laser gage beam. This approach is obviously quite complex, and may be quite costly, depending on the number of instrumented nodes along the beam path.

In the patent literature, Funazaki et.al., U.S. Pat. No. 4,854,704 has shown the use of a laser diode light source focused on a pentaprism by a set of lenses (one of which is damped) in an optical automatic leveling apparatus. The Pentaprism in Funazaki et.al. is rotatably mounted in contrast to the present invention in which it is the suspended element. Damping means in aforementioned U.S. Pat. No. 4,854,704 is magnetic in contrast to fluid damping for the prism in the present invention. Funazaki et.al. utilizes a three wire single stage suspension system in contrast to the Present invention which utilizes a two stage four wire system that essentially will gimbal from the external attachment cap.

Fluid damping per se is known in the prior art as exemplified by U.S. Pat. No. 2,843,001 issued Jul. 15, 1958 to Werner where a filament suspended pendulum utilizes a "dash pot" (or fluid damping) means in an optical tilt correcting device.

SUMMARY OF THE INVENTION

The mount according to the present invention provides a high degree of isolation from external pitch and roll (i.e., horizontal axis) disturbances by retaining optical components (including, but not limited to, lasers and pentaprism beamsplitters) in a fixed relationship with respect to the local gravity gradient, rather than in a fixed relationship with a particular jig or tool. The mount provides no isolation from external yaw disturbances (i.e., rotations about a vertical axis). However, if a constant deviation optic (e.g., a pentaprism-beamsplitter) is attached to the mount, effective isolation may also be achieved for yaw disturbances. This leads to a system capable of preserving the roll, pitch, and yaw orientation of an entire 2- or 3-dimensional network of light beams, which then become suitable for use as a tooling gage.

The mount according to the present invention is also useful for retaining optical components which divert beams out of the horizontal plane. However, some dimensional stability is lost due to the inability of the mount to retain an optic in a fixed yaw orientation. For non-horizontal beams, the mount according to the present invention provides that the included angle between the beams approaching and leaving the optical means will be preserved, as long as induced yaw rotations are kept relatively small.

An aspect of the mount according to the present invention is to isolate optical components from external rotational disturbances. No isolation from external translational disturbances is afforded by the mount beyond what is naturally achieved by the particular optical component mounted thereon. For example, a parallel-plate beamsplitter may be retained by the present mount such that an incident horizontal beam is split into two outgoing horizontal beams. Induced vertical translations of the mount do not affect the exiting beams in any way, not because of any special property of the mount, but rather because the optical component always looks the same to the incident beam. In a similar manner, optical effects due to horizontal translations of the mount will be determined solely by the nature of the optic, and will typically lead to similar translational motions in the outgoing beam(s).

In summary, the mount according to the present invention isolates optical means from external rotational disturbances about any horizontal axis. By attachment of a constant deviation optical means to the mechanical isolation means, the present invention provides the ability to preserve and maintain the relative angular relationships which exist among each and all light beam components of a network of light beams which are optically constrained to lie in a single horizontal Plane. In addition, for non-horizontal light beams, the included angle between incident and exiting beam will be preserved for small rotational disturbances of the mount about a vertical axis.

Accordingly it is an object of the present invention to provide completely a passive means for maintaining the dimensional integrity of a laser gage beam.

BRIEF DESCRIPTION OF THE DRAWINGS

FIG. 3 are exploded view showing in more detail a wire-frame computer model of prototype passive, gravity-referencing, fluid damped, 2-stage pendulum optical mount in accordance with the present invention.

DETAILED DESCRIPTION OF THE DRAWINGS

Figure 1:
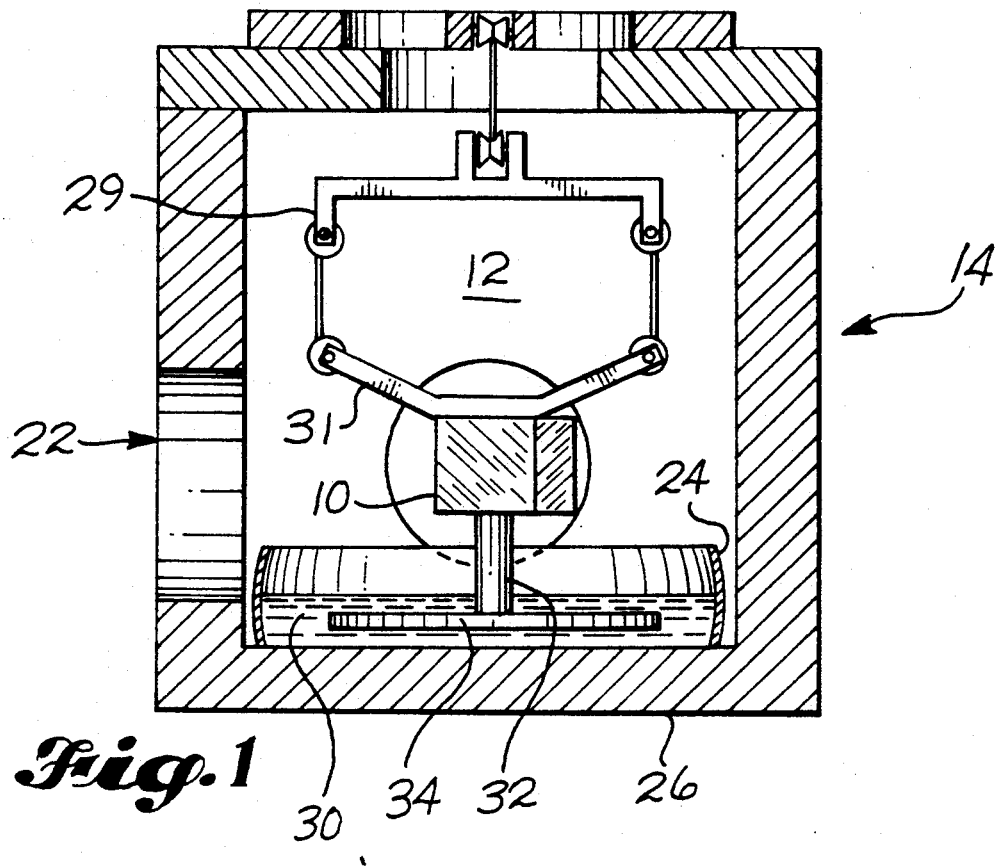
FIGS. 1 and 2 are illustrative of first and second side views of a box containing a prototype passive, gravity-referencing, fluid damped, 2-stage pendulum mechanical isolation optical mount in accordance with the present invention.
Figure 2:
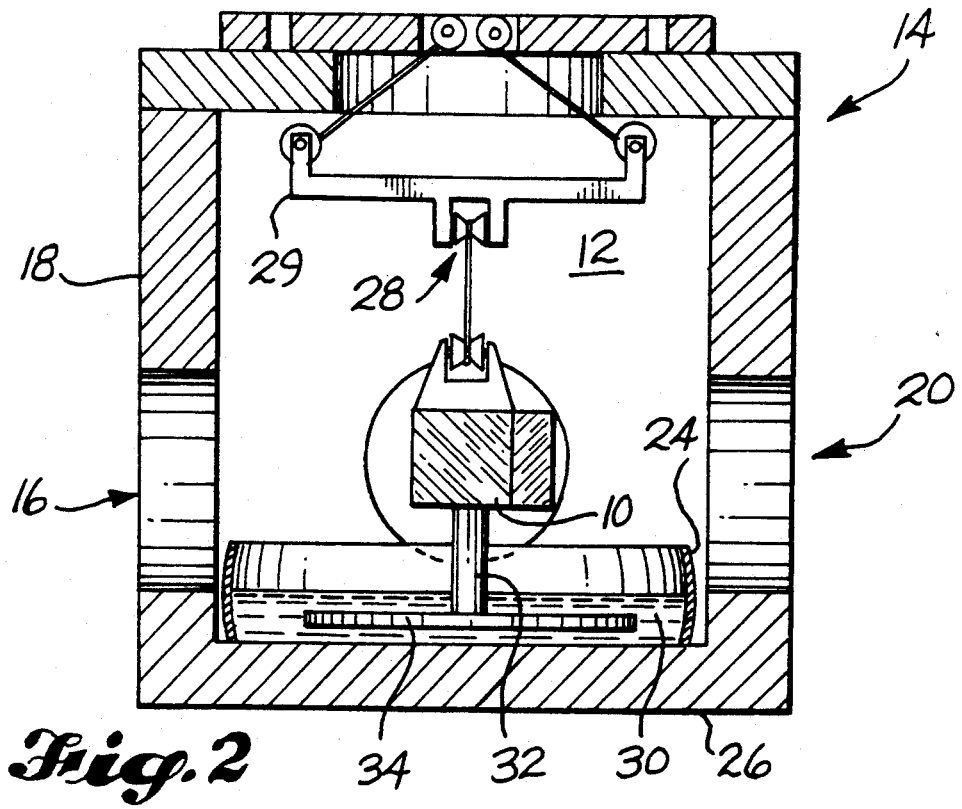

Turning to FIGS. 1 and 2 there will be seen a pentaprism beamsplitter 10 attached to passive gravity referencing fluid damped two stage pendulum optical mount 12 which includes first pendulum 29 and second pendulum 31. Pentaprism beamsplitter 10 is centered about one inch above the floor of cubically shaped box 14. Cubically shaped box 14, which encloses passive gravity referencing fluid damped two stage pendulum optical mount 12, excludes dust and air currents. FIG. 2 is a view taken from the direction of an incident light beam and shows circular entrance window 16 thereof in a side portion 18 of cubically shaped box 14. Light enters circular entrance window 16 in first side portion 18 and is incident upon pentaprism beamsplitter 10 thereby generating reflected and transmitted beams which exit cubically shaped box 14 through two exit windows in two further side portions of cubically shaped box 14 transmitted beam through first exit window 20 and reflected beam through second exit window 22. A small dish 24 containing a mixture of glycerine and water comprising damping fluid 30 is positioned on the bottom portion 26 of cubically shaped box 14 to damp out vibrations which are transmitted into two stage pendulum mount 12 from the surrounding environment. Coupling between pendulum mount 12 and the mixture of glycerine and water which comprises the damping fluid 30 is achieved by means of a rod 32 and damping plate 34 assembly which is permanently attached to the bottom of pentaprism beamsplitter 10 e.g. by epoxy cement. Damping plate is thus seen suspended within damping fluid 30.

In FIG. 2 there is shown a wire-frame drawing illustrative of features which were incorporated into a prototype of the present passive gravity referencing fluid damped two stage pendulum optical mount 12. Two stage pendulum optical mount 12 achieves mechanical isolation from imposed external rotational disturbances about all simultaneous horizontal axes via the mount which comprises: (1) the components of the 2-stage pendulum which in turn includes external attachment cap 101, center universal joint 103, and optic attachment plate 105; (2) light weight polyester thread means including upward converging threads 107, and threads 108 for attaching the components of passive gravity referencing fluid damped two stage pendum optical mount 12; (3) grooved bobbins 111 for conducting the thread means to their respective attachment points on the component parts of optical mount 12; (4) two stage pendulum optical mount 12 may include a design (not shown) for upwardly converging threads both at the universal joint and at external cap 101 for enhancing the rotational isolation effect; (5) the two stage pendulum design may provide for vertical (upward or downward) output beams via central clear apertures e.g. 113 in component parts of the two stage pendulum; (6) damping plate 34 suspended from rod 32 in damping fluid 30 to achieve vibration damping of the mount; and (7) Pentaprism beamsplitter 10 having entrance and exit faces aligned vertically, for enhancing the operation of the mount by optically isolating horizontal light beams from externally imposed rotations about the vertical axis. Also (not shown) an adjustable weight balancing system may be physically attached to, and used for adjusting the orientation of optic attachment Plate 105.

A prototype version of the two stage Pendulum optical mount 12, similar to the design illustrated in FIGS. 1 and 2, was developed and tested in a laboratory environment. This mount was shown to achieve stable angular isolation factors in the range of 5000 to 1 for imposed angular disturbances of +/−40 arc minutes over periods of time exceeding one hour, in a typical laboratory environment. Expected rotational disturbances found on tools and jigs in a factory environment have been measured to be on the order of +/−30 arc seconds. Therefore, if the prototype mount were attached to a typical jig in a factory, a total angular disturbance of 1 arc minute would result in a disturbance of only 0.058 microradians (about 0.01 arc second) transmitted through the mount to the attached optical component. If the attached optical component were a parallel plate beam splitter situated at 45 degrees with respect to a horizontal, collimated incident light beam, residual pitch and roll motions of the beamsplitter would generate beam displacement of the order of +/ −0.0001 inch or less at a distance of 150 feet from the mount, or a factor of 4 smaller than the resolution limit of the hereinbefore described LAST.

The success of the laboratory version of the subject mount was shown to be critically dependent on at least 4 factors: (1) the viscosity of damping fluid 30; (2) utilization of upward converging threads 107 for achieving a greater degree of isolation from external attitude disturbances; (3) reduction of angular cross-coupling between the upper thread pair and the lower thread Pair, by means of a carefully constructed universal joint 103, with thread attachment points 90 degrees apart; and (4) the care taken to initially align optic 10 to its preferred orientation.

What is claimed is:
1. In combination:
   a passive gravity referencing two-stage, fluid-damped pendulum optical mount;
   an optical element;
   an external attachment cap;

a four-wire suspension system coupled between said external attachment cap and said optical element;
a housing enclosing said optical element and said fourwire suspension system; and,
said housing including an entrance window for light transmission to said optical element and two exit windows for permitting transmission of reflected and transmitted light beams out of said housing.

2. In combination:
a passive gravity referencing two-stage, fluid-damped pendulum optical mount;
an optical element;
an external attachment cap;
a four-wire suspension system coupled between said external attachment cap and said optical element, wherein said four-wire suspension system comprises an upper pair of wires and a lower pair of wires; and,
said four-wire suspension system including a central universal joint for isolating the remaining annular disturbances in said upper pair of wires from said lower pair of wires.

* * * * *